(12) United States Patent
Tsuchida

(10) Patent No.: US 11,544,482 B2
(45) Date of Patent: Jan. 3, 2023

(54) ANTENNA AND WIRELESS TAG ISSUING DEVICE

(71) Applicant: TOSHIBA TEC KABUSHIKI KAISHA, Tokyo (JP)

(72) Inventor: Sunao Tsuchida, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/329,051

(22) Filed: May 24, 2021

(65) Prior Publication Data

US 2022/0164555 A1 May 26, 2022

(30) Foreign Application Priority Data

Nov. 25, 2020 (JP) .............................. JP2020-195307

(51) Int. Cl.
*G06K 7/10* (2006.01)
*H01Q 1/22* (2006.01)
*H01Q 7/00* (2006.01)

(52) U.S. Cl.
CPC ....... *G06K 7/10316* (2013.01); *H01Q 1/2208* (2013.01); *H01Q 7/00* (2013.01)

(58) Field of Classification Search
CPC ..... G06K 7/10316; H01Q 1/2208; H01Q 7/00
See application file for complete search history.

(56) References Cited

U.S. PATENT DOCUMENTS

| 8,981,910 B2 | 3/2015 | Sano |
| 10,777,909 B2 | 9/2020 | Sasaki et al. |
| 2017/0217209 A1* | 8/2017 | Tsirline .................... H01Q 3/24 |
| 2021/0075097 A1 | 3/2021 | Tsuchida |
| 2021/0286960 A1* | 9/2021 | Hilbert ............... G06K 17/0025 |

FOREIGN PATENT DOCUMENTS

| EP | 1591946 A2 | 11/2005 |
| EP | 1973068 A2 | 9/2008 |
| JP | H10-209737 A | 8/1998 |
| JP | 2005-182637 A | 7/2005 |
| JP | 2013-020501 A | 1/2013 |
| JP | 2017-041665 A | 2/2017 |
| WO | 2011060300 A2 | 5/2011 |

OTHER PUBLICATIONS

Extended European Search Report dated Dec. 17, 2021 in corresponding European Patent Application No. 21184473.3, 8 pages.

* cited by examiner

*Primary Examiner* — Laura A Gudorf

(74) *Attorney, Agent, or Firm* — Kim & Stewart LLP

(57) ABSTRACT

An antenna includes a power supply point on a substrate, a termination resistor on the substrate, and first and second lines connecting the power supply point and the termination resistor. The first line is disposed on a first surface of the substrate. The second line is disposed on a second surface of the substrate. The first line includes a plurality of loop portions arranged along a longitudinal direction of the substrate and separated from each other. The second line includes a plurality of relay portions connecting the power supply point to one of the loop portions closest thereto, connecting adjacent pairs of the loop portions to each other, and connecting the termination resistor and one of the loop portions closest thereto.

20 Claims, 6 Drawing Sheets

ANTENNA AND WIRELESS TAG ISSUING DEVICE

CROSS-REFERENCE TO RELATED APPLICATIONS

This application is based upon and claims the benefit of priority from Japanese Patent Application No. 2020-195307, filed on Nov. 25, 2020, the entire contents of which are incorporated herein by reference.

FIELD

Embodiments described herein generally relate to an antenna and a wireless tag issuing device.

BACKGROUND

There is known a technology of using an RFID (Radio Frequency Identification) tag for product management, inventory control, or the like. For example, such an RFID tag is attached to a label for a product. The RFID tag label is issued by an RFID tag issuing device. In the RFID tag issuing device, an antenna of a tag reader/writer is disposed along a conveyance path on which the labels are conveyed during processing within the device. The RFID tag issuing device uses the antenna of the tag reader/writer to read information from the RFID tag and also to write information to the RFID tag. When the RFID tag issuing device writes information to an RFID tag, it is necessary to write information only to the target RFID tag without also writing information to another, non-target RFID tag other than the target RFID tag. Therefore, it is generally required to generate a concentrated or focused magnetic field towards the particular RFID tag being written.

DETAILED DESCRIPTION

In general, according to one embodiment, an antenna includes a power supply point on a substrate, a termination resistor on the substrate, and first and second lines connecting the power supply point to the termination resistor. The first and second lines are respectively disposed on first and second surfaces of the substrate. The first line includes a plurality of loop portions arranged along a longitudinal direction of the substrate and spaced from each other. The second line includes a plurality of relay portions. The relay portions connect the power supply point to the one of the loop portions closest thereto, adjacent pairs of the loop portions to each other, and the termination resistor to the one of the loop portions closest thereto.

Hereinafter, one or more example embodiments will be described with reference to the drawings. In these embodiments, an RFID tag issuing device that has an antenna and issues an RFID tag attached to a label is described, but the disclosure is not necessarily limited to such devices.

Figure 1:
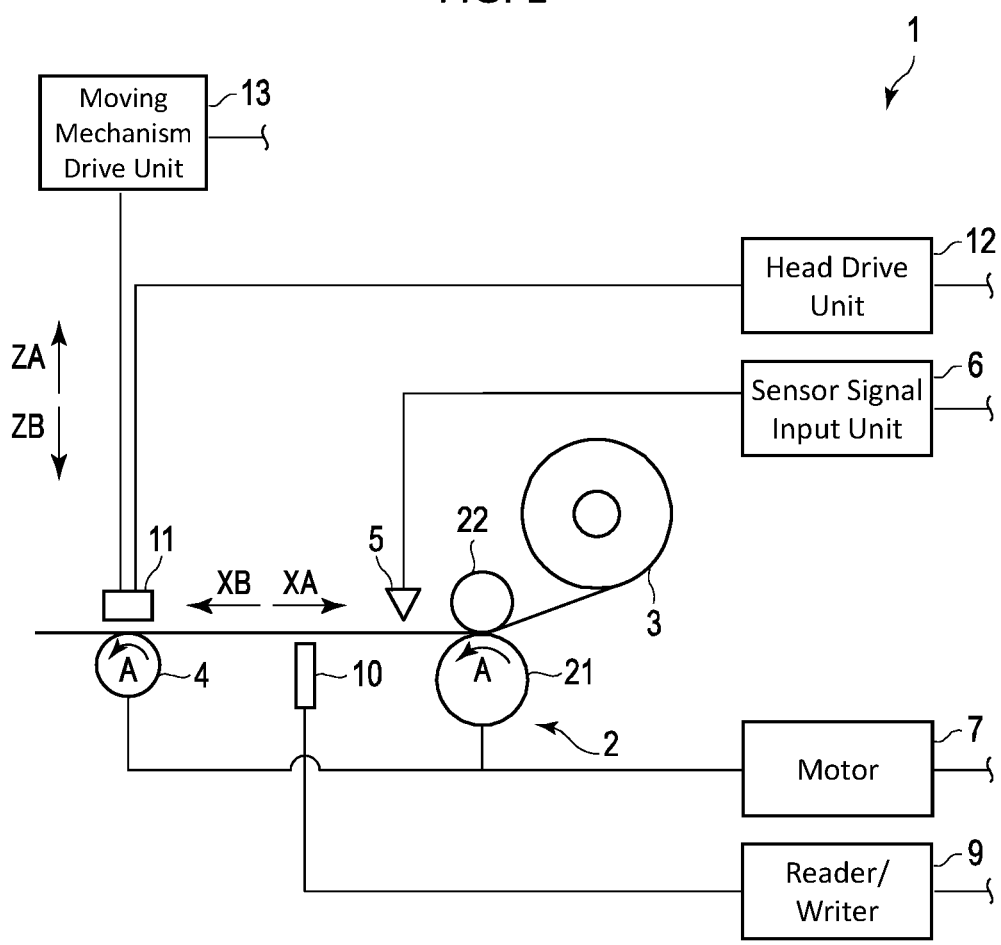
FIG. 1 is a schematic diagram showing an RFID tag issuing device according to an embodiment.
Figure 2:
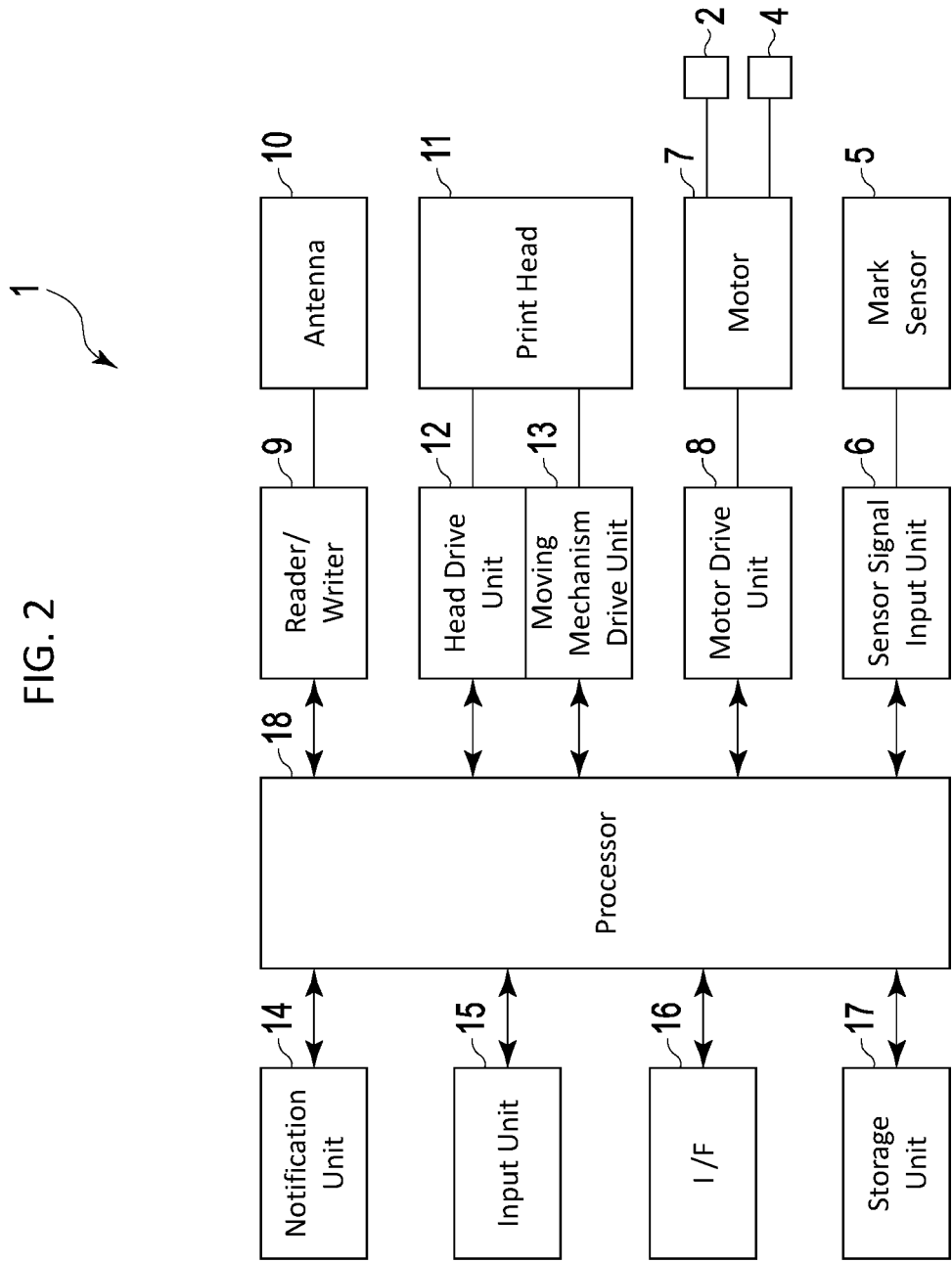
FIG. 2 is a block diagram schematically showing an RFID tag issuing device according to an embodiment.

FIG. 1 schematically shows an RFID tag issuing device 1 according to an embodiment. FIG. 2 schematically shows a block diagram of the RFID tag issuing device 1. In FIG. 1, a height direction is indicated by arrow ZA and arrow ZB. A conveyance direction is indicated by arrow XA and arrow XB. The conveyance direction intersects the height directions and may be perpendicular or substantially perpendicular thereto. An intersecting direction (e.g., the directions into and out of the page of FIG. 1) that is intersecting both the height direction and the conveyance direction is also defined. The intersecting direction may be perpendicular or substantially perpendicular to the height direction and the conveyance direction. The "carry-in side" along the conveyance direction corresponds to the pointing direction indicated by the arrow XA, and the "carry-out side" along the conveyance direction corresponds to the pointing direction indicated by the arrow XB.

Figure 3:
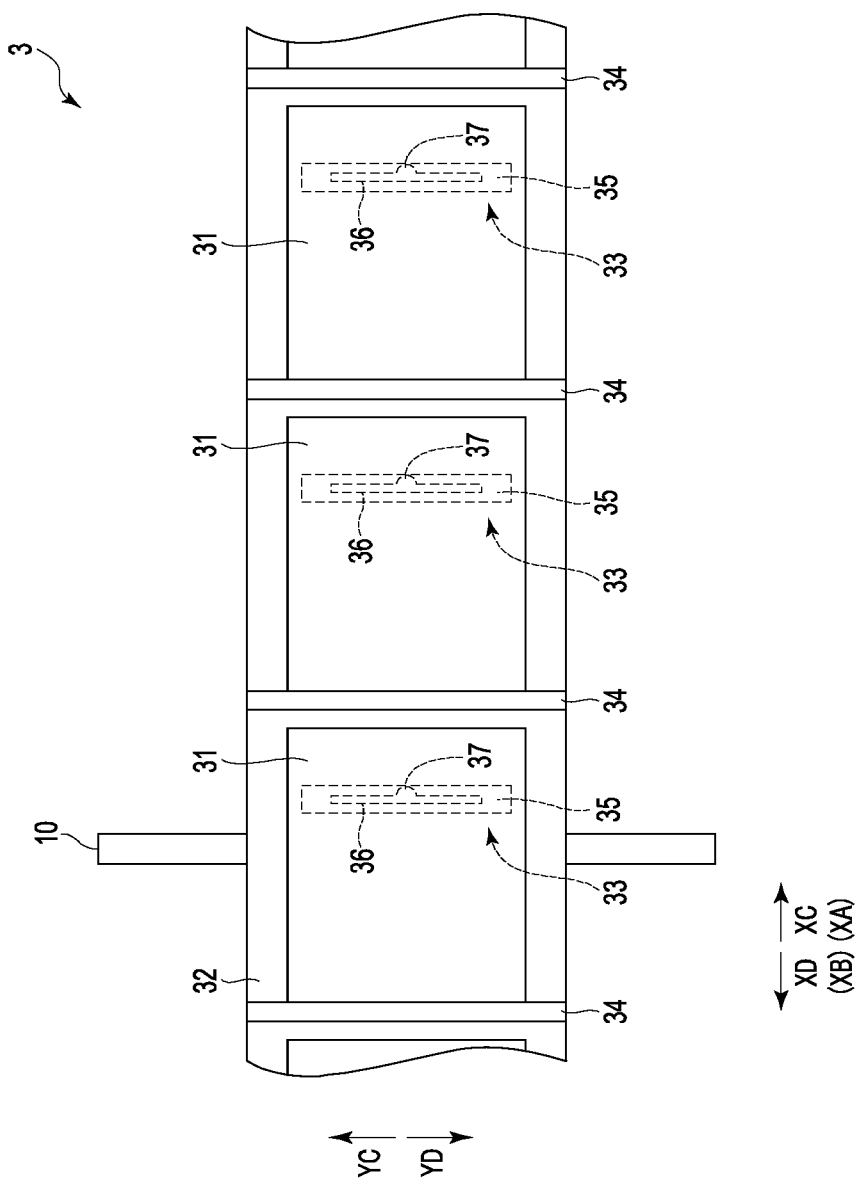
FIG. 3 is a schematic view showing a label sheet used in an RFID tag issuing device according to an embodiment.

FIG. 3 shows a label sheet 3 that can be used in the RFID tag issuing device 1. In FIG. 3, a longitudinal direction indicated by arrow XC and arrow XD and a lateral direction indicated by arrow YC and arrow YD intersecting the longitudinal direction are defined. The lateral direction may be perpendicular or substantially perpendicular to the longitudinal direction. The label sheet 3 is used in the RFID tag issuing device 1 in a state in which the longitudinal direction of the label sheet 3 coincides with the conveyance direction within the RFID tag issuing device 1 and the lateral direction of the label sheet 3 coincides with the intersecting direction within the RFID tag issuing device 1.

As shown in FIGS. 1 and 2, the RFID tag issuing device 1 includes conveyance rollers 2, a platen roller 4, a mark sensor 5, a sensor signal input unit 6, a motor 7, a motor drive unit 8, a reader/writer 9, an antenna 10, a print head 11, a head drive unit 12, a moving mechanism drive unit 13, a notification unit 14, an input unit 15, a communication interface (I/F) 16, a storage unit 17, and a processor 18. As shown in FIG. 3, the label sheet 3 includes a plurality of labels 31, a strip-shaped mount 32 to which the plurality of labels 31 are attached, RFID tags 33, and marks 34. The label sheet 3 is, for example, a rolled sheet formed by winding the mount 32 on which the plurality of labels 31 are attached.

The conveyance rollers 2 include, for example, a pair of rollers 21 and 22. The conveyance rollers 2 convey the rolled label sheet 3 along the conveyance path. In FIG. 1, the plurality of conveyance rollers 2 may be disposed on the conveyance path. In one example, the roller 21 is rotationally driven by the motor 7, and the roller 22 is rotated by the power of the rotational drive of the roller 21. That is, in this example, the roller 22 is a driven roller. The platen roller 4 rotates to convey the label sheet 3 along the conveyance path to the carry-out side along the conveyance direction. The platen roller 4 is disposed on the carry-out side of the conveyance roller 2 and the mark sensor 5 along the conveyance path. In one example, the platen roller 4 is rotationally driven by the motor 7.

The mark sensor 5 is provided so as to face the conveyance path in the height direction. The mark sensor 5 is arranged on the carry-out side along the conveyance direction from the conveyance rollers 2 and on the carry-in side along the conveyance direction from the platen roller 4 on the conveyance path. In one example, the mark sensor 5 optically detects a mark on the label sheet 3. The mark sensor 5 scans the surface of the label sheet 3 conveyed along the conveyance direction to detect the mark on the mount 32. When detecting the mark, the mark sensor 5 outputs a signal to the sensor signal input unit 6. The sensor signal input unit 6 is connected to one or more sensors including the mark sensor 5. The sensor signal input unit 6 receives the signal from the mark sensor 5 and outputs the signal to a processor.

The sensors include an open/close sensor. The open/close sensor detects opening and closing of a member that is opened and closed when the label sheet 3 is replaced. Examples of the member to be opened and closed include a cover, a door, and a lid. The open/close sensor may be, for example, an optical sensor that is switched on and off in response to closing or opening of the member. The open/close sensor may be a mechanical switch that is switched on and off in response to closing or opening of the member.

The motor 7 is mechanically connected to the conveyance rollers 2 and the platen roller 4. The motor 7 rotates the conveyance rollers 2 and the platen roller 4. In one example, the motor 7 rotates the roller 21 of the conveyance rollers 2 and the platen roller 4 in a direction indicated by an arrow A illustrated in FIG. 1. Thus, the motor 7 conveys the label sheet 3 along the conveyance path. The motor drive unit 8 controls rotation of the motor 7. In one example, the motor drive unit 8 controls forward rotation and reverse rotation of the motor 7. The motor drive unit 8 controls the motor 7 in a forward rotation state. As a result, the conveyance rollers 2 and the platen roller 4 rotate in the direction indicated by the arrow A in FIG. 1, thereby conveying the label sheet 3 to the carry-out side in the conveyance direction.

The reader/writer 9 communicates with the RFID tag 33 disposed on the label sheet 3 via the antenna 10 to write data to the RFID tag 33 and read data from the RFID tag 33. The reader/writer 9 emits radio waves for communicating with the RFID tag 33 from the antenna 10. The RFID tag 33 is activated by receiving the radio wave from the reader/writer 9, and transmits a response wave to the antenna 10. The reader/writer 9 receives the response wave from the RFID tag 33 by the antenna 10 and communicates with the RFID tag 33. Specifically, the reader/writer 9 transmits an inquiry wave that is a modulated wave following a non-modulated wave to the RFID tag 33. The RFID tag 33 is activated by the non-modulated wave, and responds to the inquiry wave from the reader/writer 9. Also in response, the reader/writer 9 transmits a non-modulated wave to the RFID tag 33. The RFID tag 33 responds by reflecting the non-modulated wave from the reader/writer 9.

The print head 11 is disposed so as to face the platen roller 4 in the height direction. The print head 11 is connected to the head drive unit 12. The print head 11 performs printing on a print surface of the conveyed label 31. That is, the print head 11 performs printing on the surface opposite to the surface on which the RFID tag 33 is provided. The head drive unit 12 drives the print head 11 to perform printing on the print surface of the label 31. The moving mechanism drive unit 13 reciprocates the print head 11 while the print head 11 is adjacent to the label sheet 3 being conveyed along the conveyance path.

The notification unit 14 performs notification by screen display, sound emission, lighting, or the like. For example, information that needs to be recognized by a user, warning information to the user, and the like are notified by the notification unit 14. The notification unit 14 is, for example, a display. The input unit 15 includes an operation member. A command related to an operation of the RFID tag issuing device 1 is input by the user via the operation member. Examples of the operation member include a button, a dial, and a touch panel. The communication interface 16 is an interface connected to a host device. The communication interface 16 receives data to be written to an RFID tag 33, print data to be printed on a label 31, and the like from a host device. The communication interface 16 transmits data such as issuance result data to the host device.

The storage unit 17 stores programs necessary for controlling the RFID tag issuing device 1 and various data such as print data and issuance result data. The storage unit 17 is, for example, a ROM (Read Only Memory), a RAM (Random Access Memory), an SSD (Solid State Drive) or the like. The processor 18 is, for example, a CPU (Central Processing Unit).

The processor 18 is connected to the sensor signal input unit 6, the motor drive unit 8, the reader/writer 9, the head drive unit 12, the moving mechanism drive unit 13, the notification unit 14, the input unit 15, the communication interface 16, and the storage unit 17. The processor 18 controls each component based on the signal input from the sensor signal input unit 6 and the programs stored in the storage unit 17. Thus, the processor 18 executes the functions of the RFID tag issuing device 1. In one example, the processor 18 cooperates with the reader/writer 9 to read data from the RFID tag 33 or write data to the RFID tag 33 by the antenna 10.

The plurality of labels 31 have a rectangular sheet shape. The labels 31 are attached to one of the main surfaces of the mount 32. Each of the labels 31 is arranged at intervals in the longitudinal direction. Each label 31 includes an adhesive surface on a surface facing the mount 32. The RFID tag 33 is provided on the adhesive surface of the label 31. The RFID tag 33 includes a film 35, a tag antenna 36, and an IC chip 37. The tag antenna 36 includes, for example, a matching circuit. The tag antenna 36 and the IC chip 37 are disposed on the film 35.

In an embodiment, each RFID tag 33 is a passive tag having no battery. Each of the marks 34 indicates the top position of the label 31 in the longitudinal direction of the label sheet 3. In one example, the length of the mark 34 in the longitudinal direction is shorter than the length of the gap between the adjacent labels 31. The position where the RFID tag 33 is attached to the label 31 is appropriately set depending on the type of the label sheet 3. In addition, the RFID tag 33 is disposed on the label 31 such that the tag antenna 36 of the RFID tag 33 intersects the longitudinal direction. In one example, the tag antenna 36 is disposed parallel or substantially parallel to the lateral direction.

Figure 4:
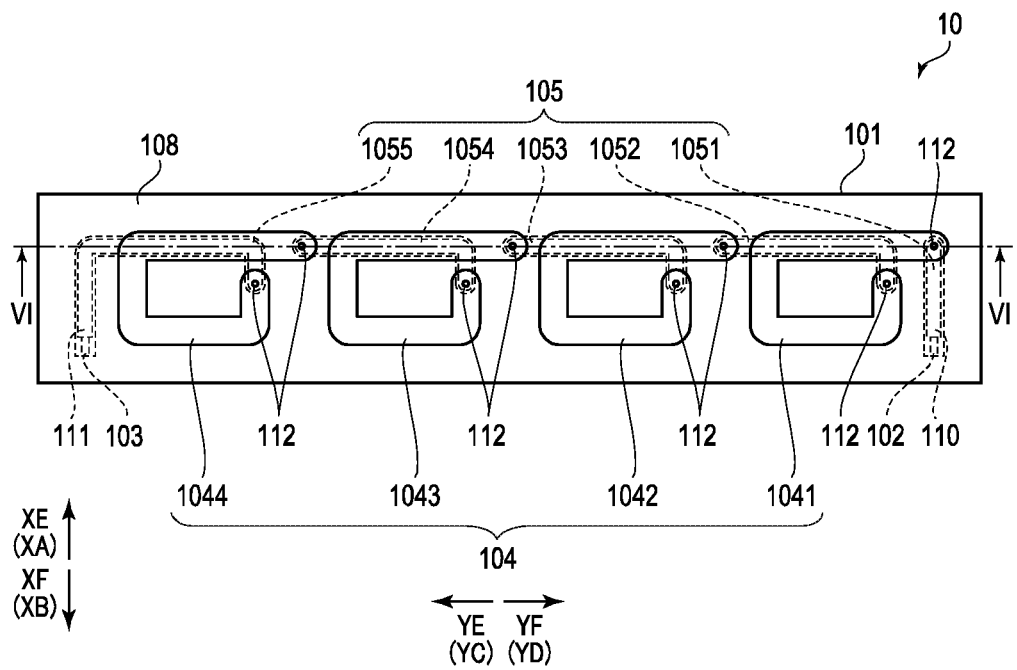
FIG. 4 is a plan view schematically showing an antenna of an RFID tag issuing device according to an embodiment.
Figure 5:
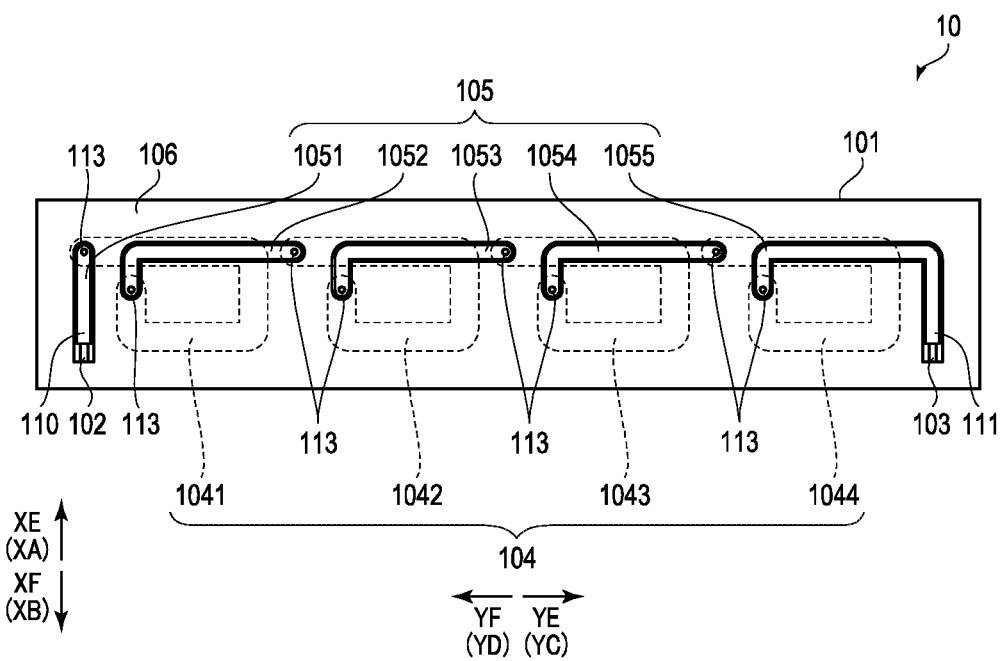
FIG. 5 is a plan view schematically showing an antenna of an RFID tag issuing device according to an embodiment viewed from a direction different from that of FIG. 4.
Figure 6:
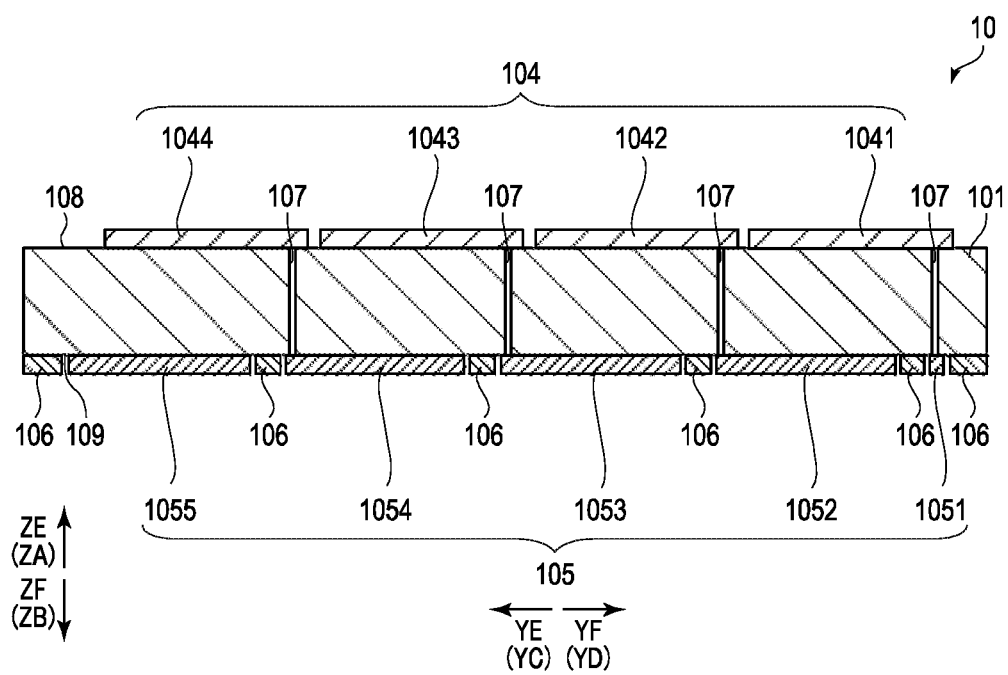
FIG. 6 is a cross-sectional view schematically showing an antenna of an RFID tag issuing device according to an embodiment.

As shown in FIGS. 4 to 6, in the antenna 10, a length direction indicated by an arrow YE and an arrow YF, a width direction indicated by an arrow XE and an arrow XF intersecting or substantially perpendicular to the length direction, and a thickness direction indicated by an arrow ZE and an arrow ZF intersecting or substantially perpendicular to both the length direction and the width direction are defined. In the antenna 10, the antenna 10 can be disposed in the RFID tag issuing device 1 such that the length direction of the antenna 10 matches (or substantially matches) the intersecting direction of the RFID tag issuing device 1. The antenna 10 can be arranged in the RFID tag issuing device 1 such that the width direction of the antenna 10 matches (or substantially matches) the conveyance direction within the RFID tag issuing device 1. The antenna 10 can be arranged in the RFID tag issuing device 1 such that the thickness direction of the antenna 10 matches (or substantially matches) the height direction of the RFID tag issuing device 1.

The antenna 10 is disposed away from the conveyance path in the height direction of the RFID tag issuing device 1. The distance by which the antenna 10 is separated from the conveyance path is appropriately set according to the radiation intensity of the antenna 10. In one example, the antenna 10 is separated from the conveyance path by 5 mm. The center of the antenna 10 in the width direction is arranged so as to coincide with or substantially coincide with the center of the conveyance path in the intersecting direction of the RFID tag issuing device 1. Therefore, the RFID tag 33 passes through the center side in the width direction of the antenna 10 by being conveyed along the conveyance path.

The antenna 10 includes a dielectric substrate 101, a power supply point 102, a termination resistor 103, lines 104 and 105, and a ground layer 106.

The dielectric substrate 101 is formed of a dielectric material. For example, the dielectric substrate 101 has a rectangular plate shape. In one example, the dimension of the dielectric substrate 101 in the length direction is larger than the dimension thereof in the width direction. The dimensions of the dielectric substrate 101 in the length direction and the width direction are not limited thereto. The dimensions of the dielectric substrate 101 can be appropriately set in accordance with the mode of use or the like in the RFID tag issuing device 1.

Via holes 107 penetrating the dielectric substrate 101 are formed in the dielectric substrate 101 in the thickness direction. As shown in FIG. 6, the via holes 107 penetrate the dielectric substrate 101 from a first main surface 108 of the dielectric substrate 101 to a second main surface 109 of the dielectric substrate 101 in the thickness direction.

As shown in FIGS. 4 and 5, the power supply point 102 is provided on one end side indicated by an arrow YF in the length direction. The power supply point 102 is connected to a first end portion 110 of extended portions of the lines 104 and 105.

The termination resistor 103 is provided on an end portion side indicated by an arrow YE opposite to the end portion side on which the power supply point 102 is located in the length direction. The termination resistor 103 is connected to a second end portion 111 on the opposite side to the first end portion 110 formed by the lines 104 and 105.

The lines 104 and 105 extend between the power supply point 102 and the termination resistor 103 in the length direction. In this context, the lines 104 and 105 are conductive connecting elements, which may also be referred to as wiring, wiring connections, wiring lines, electrical pathways, or the like.

In one example, the resistance value of the termination resistor 103 is equal to a resistance value matching the characteristic impedance of the entire extended portion formed by the lines 104 and 105.

In an embodiment, both the power supply point 102 and the termination resistor 103 are disposed on one end side indicated by the arrow XF in the width direction. Both the power supply point 102 and the termination resistor 103 are disposed on the second surface 109 of the dielectric substrate 101. The positions of the power supply point 102 and the termination resistor 103 in the width direction are not limited to those described above, and they can be arranged as appropriate in accordance with the usage pattern or the like. For example, the power supply point 102 and the termination resistor 103 may be disposed on the first surface 108 of the dielectric substrate 101. In some examples, one of the power supply point 102 or the termination resistor 103 may be disposed on the first surface 108 of the dielectric substrate 101, and the other may be disposed on the second surface 109 of the dielectric substrate 101.

The line 104 is formed on the first surface 108 of the dielectric substrate 101 (see FIG. 6). As shown in FIG. 4, the line 104 includes a plurality of loop portions (e.g., loop portions 1041, 1042, 1043, 1044). Each of the loop portions 1041 to 1044 is adjacent to at least one other of the loop portions 1041 to 1044. That is, each of the loop portions 1041 to 1044 is close to at least one of the other loop portions 1041 to 1044, though some of the plurality of loop portions may be adjacent to two other loop portions. The loop portions 1041 to 1044 are not in contact with each other on the first surface 108 of the dielectric substrate 101.

In the present embodiment, the loop portions 1041 to 1044 are arranged side by side with respect to each other in the length direction of the dielectric substrate 101. In one example, the loop portions 1041 to 1044 are arranged linearly or substantially linearly in the length direction. Vias 112 are formed at both ends of each of the loop portions 1041 to 1044. The via holes 107 of the dielectric substrate 101 shown in FIG. 6 are formed corresponding to the positions where the vias 112 are formed shown in FIG. 4. The line 104 is electrically connected to the line 105 through the vias 112 in the via holes 107.

As shown in FIG. 4, in an embodiment, each of the plurality of loop portions 1041 to 1044 is bent at three positions. That is, each of the plurality of loop portions 1041 to 1044 has two portions extending along the length direction of the dielectric substrate 101 and two portions extending along the width direction of the dielectric substrate 101. Specifically, each of the loop portions 1041 to 1044 extends along the length direction from one end portion, and then is bent towards and extends along the width direction. Further, each of the loop portions 1041 to 1044 is bent towards and extends towards the length direction, and then is bent towards the width direction and extends to the other end portion. Thus, each of the loop portions 1041 to 1044 forms a loop shape. The shape of the loop portions 1041 to 1044 is not limited to the shape described above. That is, as long as each of the loop portions 1041 to 1044 forms a loop shape, the loop shape can be appropriately adjusted in consideration of the size of the antenna 10, the required magnetic field, and the like.

The four loop portions 1041 to 1044 are formed on the first surface 108 of the dielectric substrate 101, but the embodiments are not limited thereto. That is, in the antenna 10, the number of loop portions can be adjusted in consideration of the required magnetic field intensity and the like. The size of the loop portions 1041 to 1044 can be appropriately set according to the size of the antenna 10 or the like. However, when the size of each of the loop portions 1041 to 1044 is relatively large, the magnetic field generated by each of the loop portions 1041 to 1044 does not become overall strong inside each of the loop portions 1041 to 1044. That is, the intensity of the magnetic field is high at the edge portion of each of the loop portions 1041 to 1044, and the intensity of the magnetic field is low at the inner portion of each of the loop portions 1041 to 1044. Therefore, it is preferable that the size of each of the loop portions 1041 to 1044 is set such that the magnetic field generated by each of the loop portions 1041 to 1044 will be strong inside each of the loop portions 1041 to 1044.

As shown in FIG. 5, the line 105 is formed on the second surface 109 of the dielectric substrate 101. The line 105 includes a plurality of relay portions (e.g., relay portions 1051, 1052, 1053, 1054, 1055). Each of the relay portions 1051 to 1055 is separated from the others in the length direction. That is, the relay portions 1051 to 1055 are not in contact with each other on the second surface 109 of the dielectric substrate 101. In an embodiment, the relay portions 1051 to 1055 are arranged side by side with respect to each other in the length direction. Vias 113 are formed at both ends of each relay portion 1051 to 1055. The via holes 107 of the dielectric substrate 101 are formed corresponding to the positions where the vias 113 are formed. The line 105 is connected to the line 104 by the vias 113 and the via holes 107.

The relay portion 1051 is disposed on the power supply point 102 side in the length direction and extends from one end portion along the width direction. In an embodiment, one end portion of the relay portion 1051 is connected to the power supply point 102. Each of the relay portions 1052 to 1054 extends along the length direction from one end portion, and is bent towards the width direction and extends along the width direction to the other end portion. That is, each of the relay portions 1052 to 1054 is formed in an L shape or a substantially L shape. The relay portion 1055 extends from one end portion along the width direction, and is bent towards the length direction. Further, the relay portion 1055 is bent towards the width direction and extended along the width direction to the other end portion. That is, the relay portion 1055 is formed in a U shape or a substantially U shape. In an embodiment, the other end portion of the relay portion 1055 is connected to the termination resistor 103.

As shown in FIGS. 4 and 5, the relay portions 1052 to 1055 are respectively provided at portions of the second surface 109 corresponding to the positions of the loop portions 1041 to 1044 on the first surface 108. In an embodiment, at least some of relay portions 1052 to 1055 is overlapping with loop portions 1041 to 1044 in a projection view from the thickness direction. The power supply point 102 is connected to the first end portion 110 of the relay portion 1051. The other end portion of the relay portion 1051 is connected to one end portion of the loop portion 1041 via the corresponding via 113, via hole 107, and via 112. The end portion of the loop portion 1041 not connected to the relay portion 1051 is connected to one end portion of the relay portion 1052 through the corresponding via 112, via hole 107, and via 113. Similarly, the relay portions 1052 to 1054 are connected to corresponding loop portions 1042 to 1044 via the corresponding vias 112 and 113 and via holes 107. The termination resistor 103 is connected to the second end portion 111 of the relay portion 1055 not connected to the loop portion 1044. By connecting the lines 104 and 105 in this manner, the line 104 and the line 105 are arranged to avoid overlapping each other as much as possible in a projection view from the thickness direction.

As shown in FIG. 6, the ground layer 106 is provided on the second surface 109 of the dielectric substrate 101. As shown in FIG. 5, the ground layer 106 may have a rectangular shape. The ground layer 106 is provided so as to avoid a region around the line 105. That is, a gap is formed between the line 105 and the ground layer 106. When the power supply point 102 and the termination resistor 103 are disposed on the second surface 109 of the dielectric substrate 101, the ground layer 106 is provided so as to avoid the region around the power supply point 102 and the termination resistor 103. That is, gaps are formed between the ground layer 106 and the power supply point 102 and the termination resistor 103. When the power supply point 102 and the termination resistor 103 are provided on the first surface 108, the ground layer 106 is provided not only on the second surface 109 but also in a region around the power supply point 102 and the termination resistor 103 on the first surface 108.

The size of the ground layer 106 in the length direction is equal to or greater than the maximum size of the extended portions of the lines 104 and 105 in the length direction of the antenna 10. In addition, it is equal to or smaller than the size of the dielectric substrate 101 in the length direction. The size of the ground layer 106 in the width direction is equal to or larger than the maximum size of the extended portions of the lines 104 and 105 in the width direction of the antenna 10. In addition, it is equal to or less than the size of the dielectric substrate 101 in the width direction. In an embodiment, the size of the ground layer 106 in the length direction matches (or substantially matches) the size of the dielectric substrate 101 in the length direction. The size of the ground layer 106 in the width direction is equal or substantially equal to the size of the dielectric substrate 101 in the width direction. The size of the ground layer 106 is not limited to this. When the power supply point 102 and the termination resistor 103 are disposed on the second surface 109, the ground layer 106 is preferably formed so as to cover the second surface 109 other than the portion where the power supply point 102, the termination resistor 103, and the line 105 are disposed.

As described above, in the antenna 10, the lines 104 and 105 are provided between the power supply point 102 and the termination resistor 103, and each of the loop portions 1041 to 1044 is close to at least one of the other loop portions 1041 to 1044. As a result, magnetic fields generated by the loop portions 1041 to 1044 are generated to be close to each other in the length direction of the antenna 10. That is, the magnetic field generated by each of the loop portions 1041 to 1044 is not generated separated in the length direction of the antenna 10. Therefore, regions of high magnetic field intensity in the magnetic field generated by each of the loop portions 1041 to 1044 are formed in a concentrated state along the length direction of the antenna 10.

In the antenna 10, it is preferable that the loop portions 1041 to 1044 are aligned in the length direction of the antenna 10. By arranging the loop portions 1041 to 1044 in this manner, the magnetic field generated by the loop portions 1041 to 1044 is generated in a more concentrated state along the length direction of the antenna 10. Therefore, regions of high magnetic field intensity in the magnetic field generated by each of the loop portions 1041 to 1044 are formed in a more concentrated state in the length direction of the antenna 10.

In the antenna 10, the ground layer 106 is preferably provided on the second main surface opposite to the first main surface on which the loop portions 1041 to 1044 are provided in the thickness direction. By disposing the ground layer 106 in this manner, it is possible to suppress generation of a magnetic field generated by the loop portions 1041 to 1044 in a direction from the first main surface 108 toward the second surface 109 in the thickness direction of the antenna 10. That is, in the antenna 10, the loop portions 1041 to 1044 generate a magnetic field in a direction from the second surface 109 toward the first surface 108. Thus, generation of a magnetic field in an unnecessary direction is suppressed in the antenna 10.

For the antenna 10, it is preferable that the line 104 be disposed on the first surface 108, the line 105 be disposed on the second surface 109, and the line 104 and the line 105 to avoid overlap of each other as much as possible in a projection view from the thickness direction. The ground layer 106 preferably covers the second surface 109 as much as possible. By forming the lines 104 and 105 and the ground layer 106 in this manner, power can be efficiently supplied from the power supply point 102 to the termination resistor 103 in the antenna 10. As a result, the antenna 10 can reliably generate a required magnetic field.

In addition, the antenna 10 is disposed in the RFID tag issuing device 1 such that the length direction of the antenna 10 intersects with the conveyance direction within the RFID tag issuing device 1. That is, the magnetic field formed in parallel in the longitudinal direction of the antenna 10 is formed crossing while the label sheet 3 is being conveyed. Therefore, the RFID tag issuing device 1 can write data in the target RFID tag on the label sheet 3 regardless of the position of the label sheet 3 in the width direction of the antenna 10.

Modification Example

Figure 7:
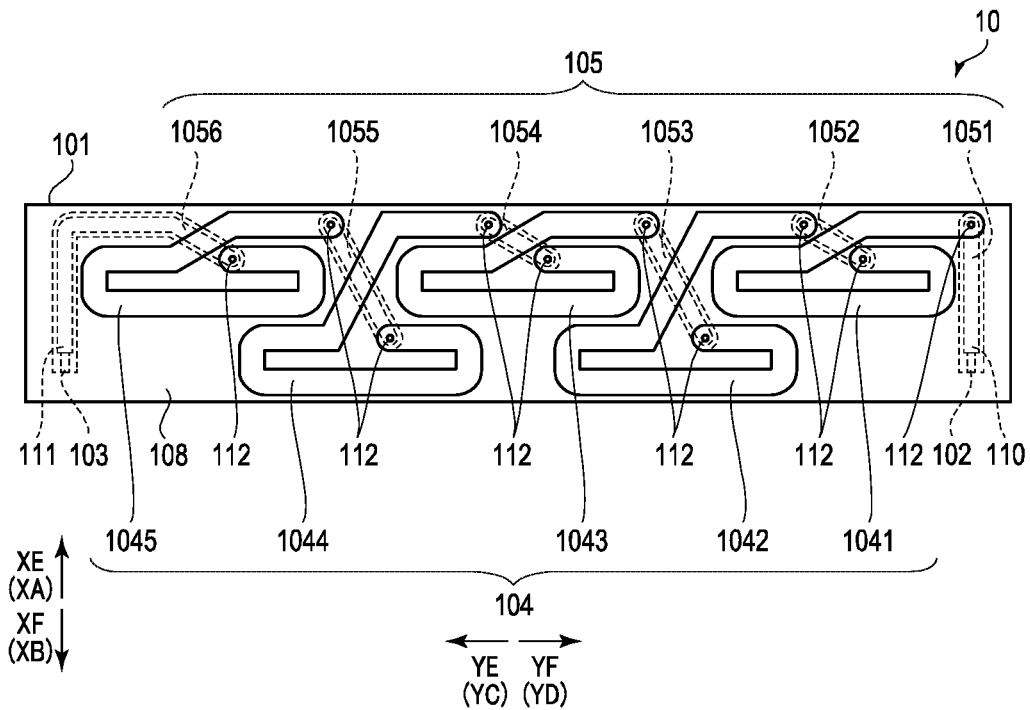
FIG. 7 is a plan view schematically showing an antenna of an RFID tag issuing device according to a modification of an embodiment.
Figure 8:
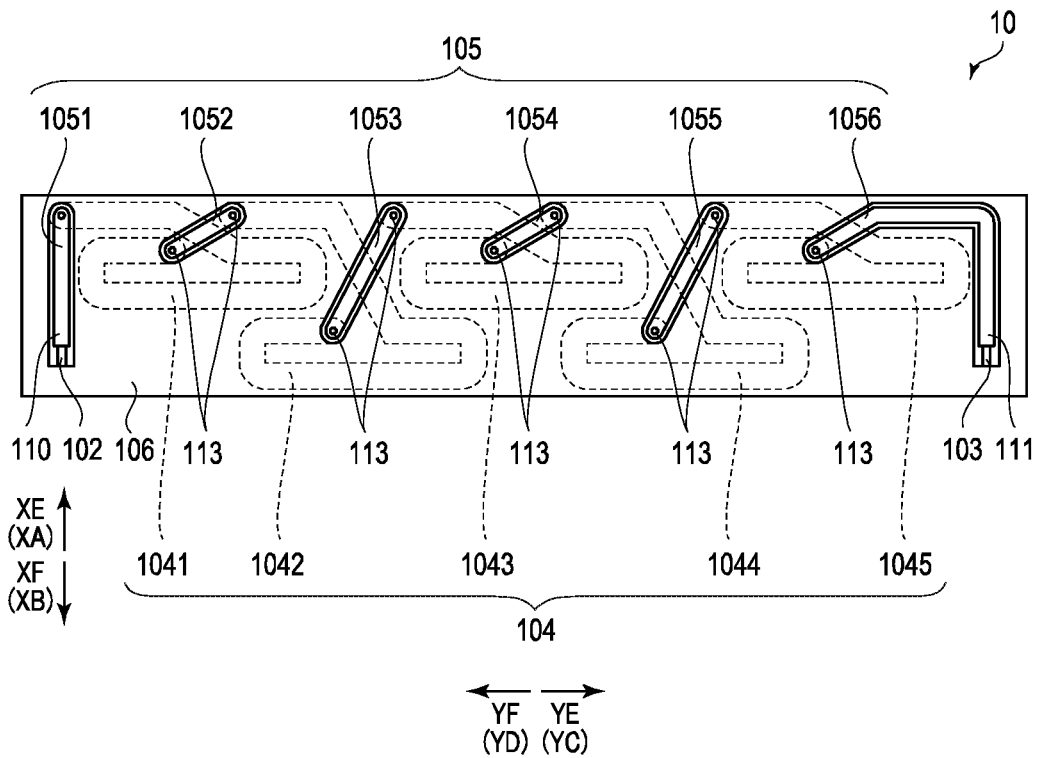
FIG. 8 is a plan view schematically showing an antenna of an RFID tag issuing device according to a modification of an embodiment viewed from a direction different from FIG. 7.

FIGS. 7 and 8 are schematic antenna 10 according to a modification example. In FIGS. 7 and 8, similarly to FIGS. 4 to 6, the length direction, the width direction, and the thickness direction are defined. Also in this modification, the power supply point 102 is provided on one side in the length direction, and the termination resistor 103 is provided on the other side. The power supply point 102 is connected to the first end portion 110 of the extended portion formed by the lines 104 and 105. The termination resistor 103 is connected to the second end portion 111 of the extended portion formed by the lines 104 and 105. The lines 104 and 105 are connected to each other through corresponding vias 112 and 113 and via holes 107. In this modification, the line 104 includes the loop portions 1041 to 1045, and the line 105 includes the relay portions 1051 to 1056. The loop portions 1041 to 1045 and the relay portions 1051 to 1056 are connected to each other through corresponding vias 112 and 113 and via holes 107.

In this modification, each of the loop portions 1041 to 1045 is bent at six positions, as illustrated in FIG. 7. That is, each of the loop portions 1041 to 1045 has four portions extending along the length direction of the dielectric substrate 101 and three portions extending along the width direction of the dielectric substrate 101. In each of loop portions 1041 to 1045, one end portion is disposed on the point 102 side with respect to the other portion in the length direction of the dielectric substrate 101. In each of the loop portions 1041 to 1045, the pair of end portions are a shifted with respect to each other in the width direction.

In this modification, at least some of the loop portions 1041 to 1045 are shifted from the others in the width direction. In addition, at least some of the loop portions 1041 to 1045 are overlapping each other in projection view seen from the width direction. That is, the loop portions 1041 to 1045 are arranged in a staggered manner along the length direction on the first surface 108 of the dielectric substrate 101. In the present modification, the loop portions 1041, 1043, 1045 are provided on one side in the width direction and loop portions 1042 and 1044 are provided on the opposite side from loop portions 1041, 1043, and 1045 in the width direction. The loop portion 1042 has a portion overlapping with the loop portions 1041 and 1043 in a projection view from the width direction, and is between the loop portion 1041 and the loop portion 1043 in the length direction. Similarly, the loop portion 1044 has a portion overlapping the loop portions 1043 and 1045 in a projection view from the width direction, and is between the loop portion 1043 and the loop portion 1045 in the length direction.

Because of the antenna 10 configured as described above, in the antenna 10 of the present modification example, a region in which the intensity of the magnetic field in the generated magnetic field is high is formed without interruption in the length direction. Therefore, the magnetic field can be generated in a continuous state in the length direction and in a further concentrated state. Also, the lines 104 and 105 are provided between the power supply point 102 and the termination resistor 103, and each of the loop portions 1041 to 1045 is close to at least one of the other loop portions 1041 to 1045. Therefore, the antenna 10 also exhibits the same effect as those of the above-described embodiments and the like. Therefore, in the RFID tag issuing device 1 using the antenna 10, even if the label sheet 3 is displaced to some extent in the direction intersecting the conveyance direction, it is possible to reliably write information in the target RFID tag.

According to at least one of these embodiments, the antenna comprises a dielectric substrate, a power supply point, a termination resistor, and a line. The power supply point is provided on the dielectric substrate. The termination resistor is provided on the dielectric substrate away from the power supply point. The line is provided between the power supply point and the termination resistor. The line includes a plurality of loop portions. Each of the plurality of loop portions is disposed in proximity to at least one of the other loop portions. This allows the antenna to generate a concentrated magnetic field.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An antenna, comprising:
a power supply point on a substrate;
a termination resistor on the substrate;
first and second lines connecting the power supply point and the termination resistor, the first line being on a first surface of the substrate, and the second line being on a second surface of the substrate, the first and second surfaces being on opposite sides of the substrate, wherein
the first line includes a plurality of loop portions physically separated from each other on the first surface along a longitudinal direction of the substrate, and
the second line includes a plurality of relay portions connecting the power supply point to one of the loop portions closest thereto, connecting adjacent pairs of loop portions to each other, and connecting the termination resistor and one of the loop portions closest thereto.

2. The antenna according to claim 1, wherein each of the loop portions includes:
a first part extending along the longitudinal direction,
a second part connected to the first part and extending along a width direction crossing the longitudinal direction,
a third part connected to the second part and extending along the longitudinal direction, and
a fourth part connected to the third part and extending along the width direction towards the first part.

3. The antenna according to claim 2, wherein an end of the fourth part of one of the loop portions is connected to one of the relay portions.

4. The antenna according to claim 3, wherein an end of the first part of said one of the loop portions is connected to one of the relay portions directly connected to the power supply point.

5. The antenna according to claim 2, wherein an end of the fourth part of one of the loop portions is connected to one of the relay portions directly connected to the termination resistor.

6. The antenna according to claim 1, wherein the power supply point and the termination resistor are on the second surface.

7. The antenna according to claim 6, wherein the relay portion connecting the power supply point and the one of the loop portions closest thereto extends along a width direction of the substrate crossing the longitudinal direction.

8. The antenna according to claim 6, wherein the relay portion connecting each adjacent pair of the loop portions has an L-shape.

9. The antenna according to claim 6, wherein the relay portion connecting the termination resistor and the one of the loop portions closest thereto has a U-shape.

10. The antenna according to claim 1, wherein
each of the loop portions includes a straight part and a loop-shape part, and
the loop portions are arranged such that the loop-shape part of each of the loop portions is located in a staggered manner along the longitudinal direction.

11. The antenna according to claim 10, wherein loop-shape parts of two of the loop portions partially overlap each other when viewed from a width direction of the substrate crossing the longitudinal direction.

12. A wireless tag issuing device, comprising:
an antenna including:
a substrate,
a power supply point on the substrate,
a termination resistor on the substrate, and
first and second lines connecting the power supply point and the termination resistor, the first line on a first surface of the substrate, and the second line on a second surface of the substrate, the first and second surfaces being on opposite sides of the substrate, wherein
the first line includes a plurality of loop portions physically separated from each other on the first surface along a longitudinal direction of the substrate, and
the second line includes a plurality of relay portions connecting the power supply point to one of the loop portions closest thereto, connecting adjacent pairs of the loop portions to each other, and connecting the termination resistor and one of the loop portions closest thereto; and
a processor configured to cause the antenna to transmit a radio wave for writing information into a wireless tag.

13. The wireless tag issuing device according to claim 12, further comprising:
a conveyance roller configured to convey a label to which the wireless tag is attached along a conveyance direction that crosses the longitudinal direction of the substrate.

14. The wireless tag issuing device according to claim 13, further comprising:
a sensor configured to detect a position of the label, wherein
the processor is configured to control the transmission of the radio wave based on an output from the sensor.

15. The wireless tag issuing device according to claim 13, further comprising:
a printing head disposed on a downstream side of the antenna in the conveyance direction and configured to print an image on the label.

16. The wireless tag issuing device according to claim 12, wherein each of the loop portions includes:
a first part extending along the longitudinal direction,
a second part connected to the first part and extending along a width direction crossing the longitudinal direction,
a third part connected to the second part and extending along the longitudinal direction, and
a fourth part connected to the third part and extending along the width direction towards the first part.

17. The wireless tag issuing device according to claim 16, wherein an end of the fourth part of one of the loop portions is connected to one of the relay portions.

18. The wireless tag issuing device according to claim 17, wherein an end of the first part of the one of the loop portions is connected to one of the relay portions that is directly connected to the power supply point.

19. The wireless tag issuing device according to claim 16, wherein an end of the fourth part of one of the loop portions is connected to one of the relay portions that is directly connected to the termination resistor.

20. The wireless tag issuing device according to claim 12, wherein the power supply point and the termination resistor are on the second surface.

* * * * *